United States Patent
Kwak et al.

(10) Patent No.: US 9,143,415 B1
(45) Date of Patent: Sep. 22, 2015

(54) METHOD AND SYSTEM FOR DETECTING LOSS OF SYNCHRONIZATION IN PORTS

(71) Applicant: QLOGIC, Corporation, Aliso Viejo, CA (US)

(72) Inventors: David T. Kwak, Newport Coast, CA (US); Oscar L. Grijalva, Cypress, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 111 days.

(21) Appl. No.: 13/852,872

(22) Filed: Mar. 28, 2013

Related U.S. Application Data

(60) Provisional application No. 61/719,153, filed on Oct. 26, 2012.

(51) Int. Cl.
  *H04L 12/28* (2006.01)
  *H04L 12/26* (2006.01)

(52) U.S. Cl.
  CPC .................................... *H04L 43/08* (2013.01)

(58) Field of Classification Search
  None
  See application file for complete search history.

(56) References Cited

U.S. PATENT DOCUMENTS

| | | | |
|---|---|---|---|
| 6,961,876 B2 * | 11/2005 | Gregg et al. | 714/43 |
| 2010/0115132 A1 * | 5/2010 | Hirata et al. | 709/245 |

* cited by examiner

*Primary Examiner* — Afshawn Towfighi
(74) *Attorney, Agent, or Firm* — Klein, O'Neill & Singh, LLP

(57) ABSTRACT

Machine implemented method and system of detecting a loss of sync at a port of a network device coupled to a port of another device is provided. The port includes logic configured to detect that a special character has not been received by the port for a programmable duration; and generates a signal for a processor of the network device indicating a loss of sync between the port of the network device and the port of the other device.

18 Claims, 5 Drawing Sheets

METHOD AND SYSTEM FOR DETECTING LOSS OF SYNCHRONIZATION IN PORTS

CROSS REFERENCE TO RELATED APPLICATIONS

This patent application claims the benefit under 35 U.S.C. §119(e) of U.S. Provisional Application Ser. No. 61/719,153, filed on Oct. 26, 2012. The disclosure of the aforementioned provisional application is incorporated herein in its entirety.

TECHNICAL FIELD

The present invention relates to computing systems and network devices.

BACKGROUND

A computer network, often referred to simply as a network, is a group of interconnected computing devices that facilitates communication among users and allows users to share resources, for example, storage space at storage devices using a storage area network (SAN). Adapters, switches, and routers (jointly referred to as network devices) may be used to interconnect computing systems, storage devices and others. These network devices use a port having logic for receiving and transmitting information. A port may lose a signal (referred to as loss of synchronization, or sync) due to a variety of reasons, for example, a link failure, a cable is unplugged and others. Detecting loss of sync is desirable for efficient operation of a computer network. Continuous efforts are being made to improve communication and efficiently detect loss of sync.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine implemented method of detecting a loss of sync at a port of a network device coupled to a port of another device is provided. The method includes detecting that a special character has not been received by the port of the network device for a programmable duration; and generating a signal for a processor of the network device indicating the loss of sync between the port of the network device and the port of another device.

In another embodiment, a system having a port of a network device coupled to a port of another device for sending and receiving frames is provided. The port includes logic configured to detect that a special character has not been received by the port for a programmable duration; and generates a signal for a processor of the network device indicating a loss of sync between the port of the network device and the port of the other device.

In yet another embodiment, a network device is provided. The network device includes a port coupled to a port of another device for sending and receiving frames. The port of the network device includes: a decode module from receiving incoming frames; a word sync logic that detects if valid data has been received and generates a loss of sync signal when valid data is not received; a special character recognition module that is configured to detect that a special character has not been received by the port; and a timer that tracks a duration for which the special character has not been received and generates a signal for a processor of the network device indicating the loss of sync between the port of the network device and the port of the other device.

This brief summary has been provided so that the nature of the disclosure may be quickly understood. A more complete understanding of the disclosure can be obtained by reference to the following detailed description of the various embodiments thereof concerning the attached drawings.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

Figure 1A:
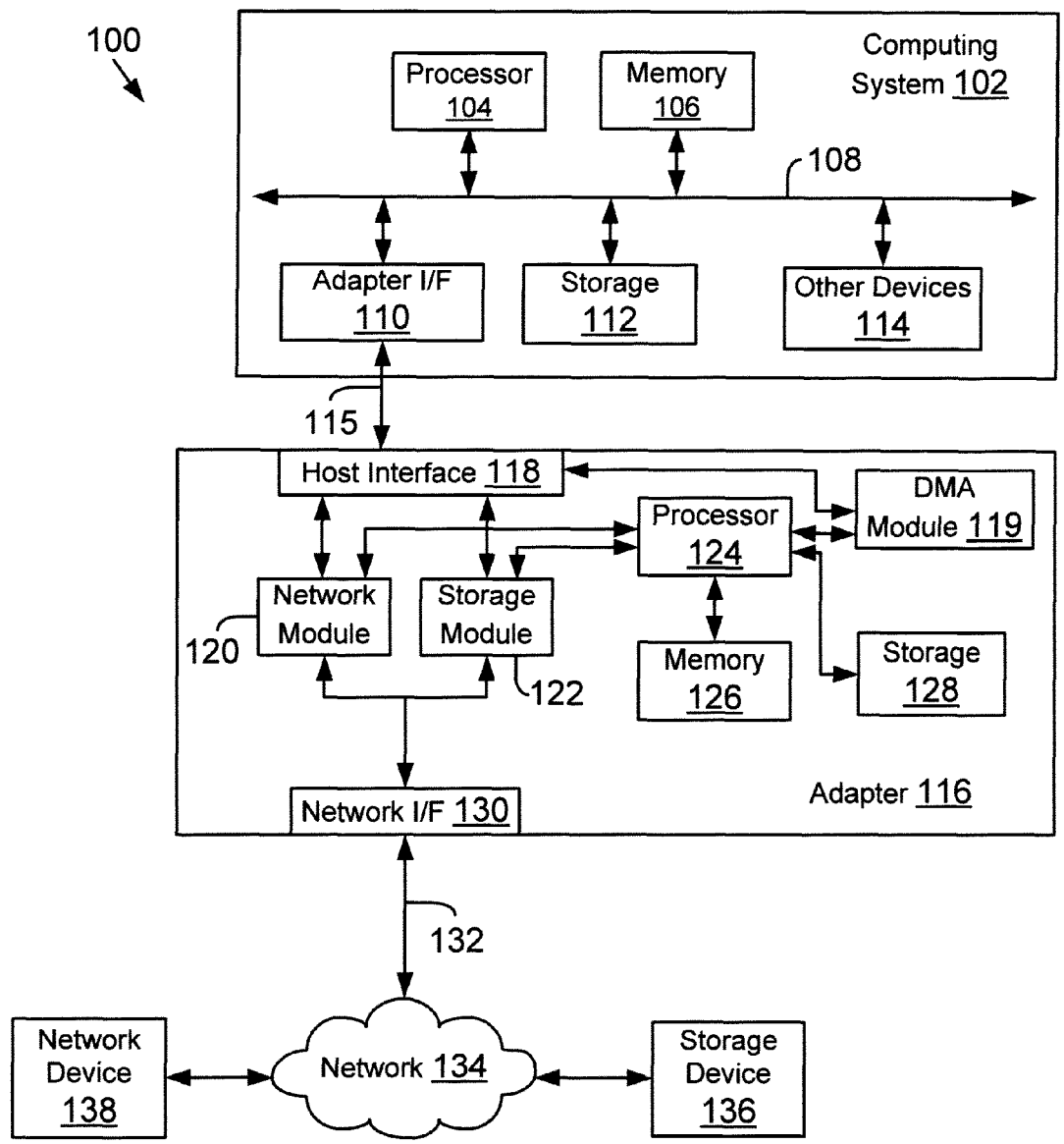
FIG. 1A is a functional block diagram of a computing system coupled to a network via a network device, according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

FIG. 1A is a block diagram of a system 100 configured for use with the present embodiments. The system 100 may include one or more computing system 102 (may also be referred to as "host system 102") coupled to another device via a link 115, for example, an adapter 116 that interfaces with a network 134. The network 134 may include, for example, additional computing systems, servers, storage systems, etc. It is noteworthy that although the description below is based on the interaction between adapter 116 and host system 102, the embodiments disclosed herein are not limited to any particular adapter type or device type.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (or computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 interfaces with the adapter 116 via the link 115 for sending and receiving information. Link 115 may be an interconnect system, for example, a PCIe (PCI-Express) bus. The computing system 102 also includes other devices and interfaces 114, which may include a display device interface, a keyboard interface, a pointing device interface and others. Details regarding the other devices 114 are not germane to the embodiments disclosed herein.

The computing system 102 may further include a storage device 112, which may be for example a hard disk, a CD-ROM, a non-volatile memory device (flash or memory stick) or any other mass storage device. Storage 112 may store operating system program files, application program files, and other files. Some of these files are stored at storage device 112 using an installation program. For example, the processor 104 may execute computer-executable process steps of an installation program so that the processor 104 can properly execute the application program.

Memory 106 also interfaces to the computer bus 108 to provide the processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple the adapter 116 to the computing system 102. The adapter 116 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage technology used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port. The term port as used herein means an interface that includes logic and circuitry to process Fibre Channel frames. A port is typically identified by a unique identifier (for example, world-wide unique port number) and communicates with other ports.

A new and upcoming standard, called Fibre Channel over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 116 shown in FIG. 1A may be configured to operate as an FCOE adapter and may be referred to as FCOE adapter 116. QLogic Corporation, the assignee of the present application, provides one such adapter. The illustrated adapter 116, however, does not limit the scope of the present embodiments. The present embodiments may be practiced with adapters and other network devices having different configurations.

Referring back to FIG. 1A, adapter 116 interfaces with the computing system 102 via the link 115 and a host interface 118. In one embodiment, the host interface 118 may be a PCI Express interface having logic/circuitry for sending and receiving PCI-Express packets described below in detail.

The adapter 116 may also include a processor (or more than one processor) 124 that executes firmware instructions out of a memory 126 to control overall adapter operations. The adapter 116 may also include storage 128, which may be for example non-volatile memory, such as flash memory, or any other device. The storage 128 may store executable instructions and operating parameters that can be used for controlling adapter operations.

The adapter 116 includes a network module 120 for handling network traffic via a link 132. In one embodiment, the network module 120 includes logic and circuitry for handling network packets, for example, Ethernet or any other type of network packets. The network module 120 may include memory buffers (not shown) to temporarily store information received from other network devices 138 and transmitted to other network devices 138.

The adapter 116 may also include a storage module 122 for handling storage traffic to and from storage devices 136. The storage module 122 may further include memory buffers (not shown) to temporarily store information received from the storage devices 136 and transmitted by the adapter 116 to the storage devices 136. In one embodiment, the storage module 122 is configured to process storage traffic according to the Fibre Channel storage protocol, or any other protocol. It is noteworthy that adapter 116 may only have a network module 120 or a storage module 122. The embodiments described herein are not limited to any particular adapter type.

The adapter 116 also includes a network interface 130 that interfaces with link 132. The network interface 130 includes logic and circuitry to receive information via the network link 132 and pass it to either the network module 120 or the storage module 122, depending on the packet type. In one embodiment, network interface 130 may be referred to as port. Details regarding network interface 130 are provided below.

Adapter 116 also includes a direct memory access (DMA) module 119 that is used to manage access to link 115. The DMA module 119 uses a plurality of DMA channels (not shown) for transferring data via link 115. The DMA channels are typically used to move control structures such as input/output control blocks (IOCBs), input/output status blocks (IOSBs) and data between host system memory 106 and the adapter memory 126.

Figure 1B:
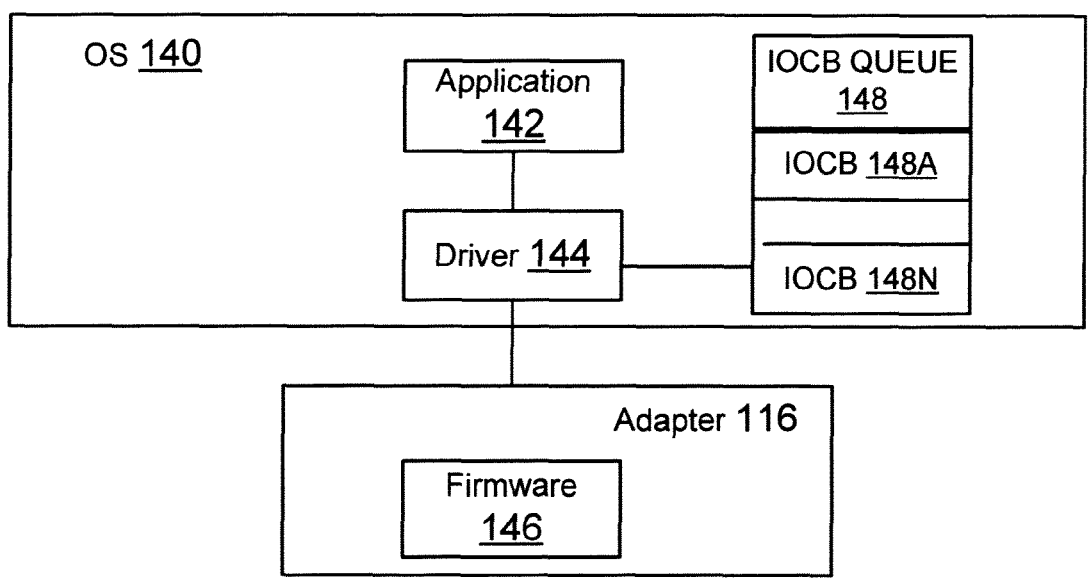
FIG. 1B shows a block diagram of a generic architecture used by the system of FIG. 1A.

FIG. 1B shows an example of a generic software architecture used by system 100. Processor 104 executes an operating system 140 for controlling the overall operations of computing system 102. The operating system may be Windows based, Linux operating system, Solaris, or any other operating system type. The embodiments disclosed herein are not limited to any particular operating system type.

An application 142 may be executed by processor 104 for performing certain functions. For example, application 142 may be an email program, a database application or any other application type. Application 142 may send a command to a driver 144 for performing an operation, for example, reading and/or writing data (input/output (I/O) at another storage device. The driver 144 processes the request and communicates with firmware 146 executed by processor 124 of adapter 116. A component of adapter 116 then processes the request.

Typically, for managing data transfers across link 115, the following process steps are used: an IOCB is first generated by the driver 144 and saved at an IOCB queue 148, shown as 148A-148N. The IOCB queue 148 may be at host memory 106 or any other location. The IOCB is then obtained and processed by adapter 116, which may be to provide data to host processor 104 or to send data provided by host processor 104.

Figure 1C:
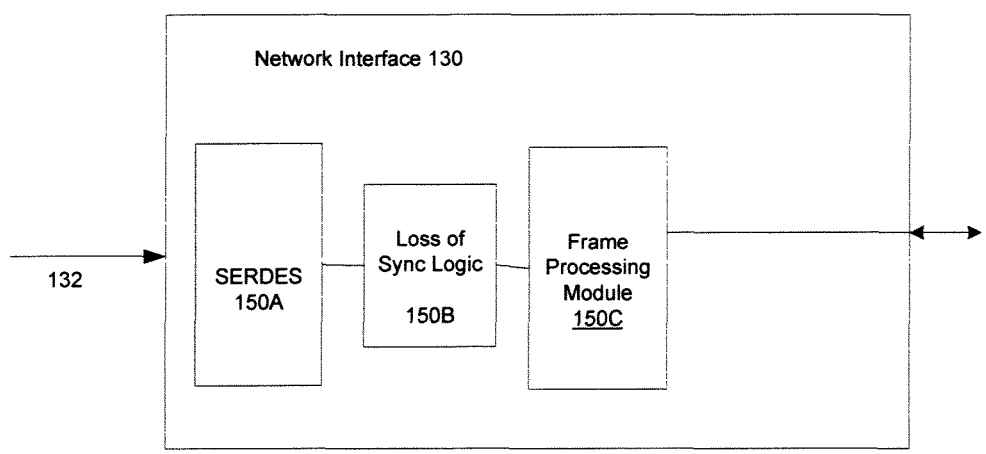
FIG. 1C shows an example of network interface 130 used for communication, according to one embodiment.

FIG. 1C shows a block diagram of network interface block 130 of adapter 116, according to one embodiment. The network adapter 130 includes a serial/de-serializer (SERDES) 150A that receives serial data from network link 132 and converts it to parallel data and vice-versa.

In conventional SERDES, a clock was generated based on incoming data on link 132. If there was a link failure, then there was a loss of signal. This loss of clock signal was used to detect a loss of sync (i.e. loss of signal). Loss of sync was also detected when there was a code violation and proper frames were not received.

Today, SERDES 150A generate their own clock by using a PLL (phase loop locked) module (not shown). SERDES 150A may also insert a D21.4 character, which adapter 116 recognizes as valid data. So if there is a loss of signal on link 132, it may go undetected because there is no loss of clock signal or code violation since the rest of the logic of network interface 130 continues to receive D21.4 characters as well as a valid clock signal.

The embodiments of this disclosure provide logic and a method for efficiently detecting loss of sync even though conventional techniques may fail to detect the loss of sync. Network interface 130 uses a frame processing module 150C that processes frames received from SERDES 150A, while a loss of sync module 150B (may also be referred to as module 150B) detects loss of sync, as described below in detail.

Figure 2A:
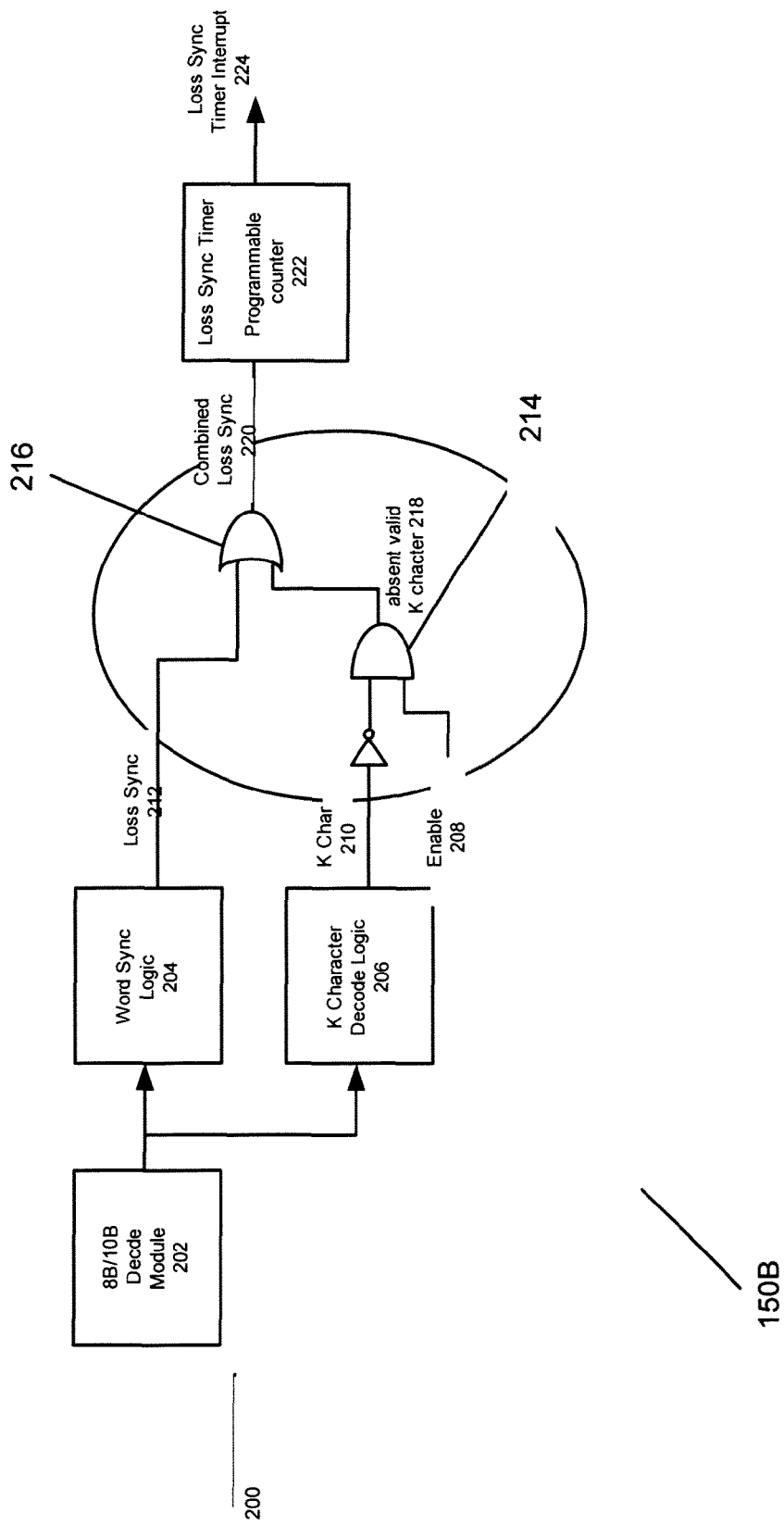
FIG. 2A shows a system for detecting loss of sync, according to one embodiment.

FIG. 2A illustrates a block diagram of loss of sync logic 150B, according to one embodiment. Module 150B includes a 8 b/10 b decode module 202 that receives incoming data 200 from SERDES 150A (FIG. 1C). The 10 bit data is decoded to 8 bits and then provided to word sync logic 204. Word sync logic 204 can be used to detect if the received data is valid or not. If it detects that received data is not valid it generates a loss of sync signal 212, like conventional systems. As mentioned above, if SERDES 150A sends D21.4 characters, then word sync logic 204 may not be able to detect an invalid character and may keep sending D21.4 characters while there is a loss of sync.

The received data 200 may also include special control characters, referred to as K28.5 or simply as K characters. K characters include start of frame, end of frame, delimiters, IDLE characters and other primitive signals defined by the Fibre Channel standard. K characters are expected within less than 2 frame times. The following provides an example of two frames that may be received by network interface 130:

| SOF | Frame Header | Payload | CRC | EOF | Fill Characters | Fill Characters | SOF | Frame Header | Payload |
|---|---|---|---|---|---|---|---|---|---|

In one embodiment, the logic provided herein assumes a loss of sync when no K characters are received within a programmable duration. Decode module 202 provides incoming data to K character decode logic 206. A K character signal 210 is inverted and provided to logic 214 that also receives an enable signal 208. When a K character is absent, then signal 218 is provided to logic 216 that also received signal 212. A combined loss of sync signal 220 is then sent to the loss of sync timer 222 that includes a programmable counter. The timer counts the duration when a K character is not received. When the programmed duration is reached (for example, two frame times) then a loss of sync timer interrupt signal 224 is generated for processor 124 to indicate a loss of sync for network interface 130.

Figure 2B:
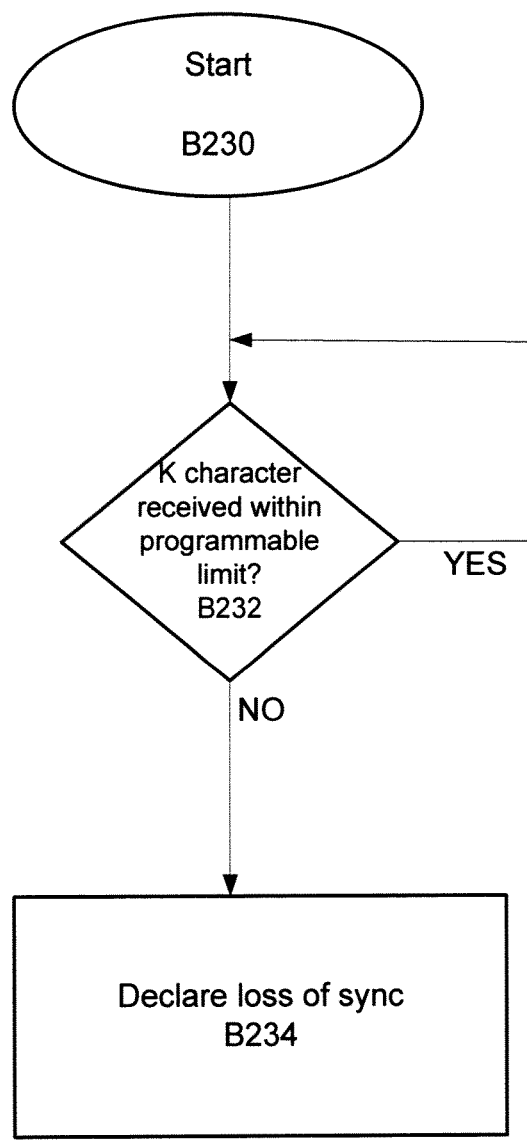
FIG. 2B shows a process for using the system of FIG. 1C, according to one embodiment.

FIG. 2B shows a process for detecting loss of sync, according to one embodiment. The process begins in block B230, when frames 200 are received from SERDES 150A. Decode logic 202 decodes the frames. In block B232, the process determines if a K character has been received within a programmable duration. The duration is counted by timer 222. If K characters are not received within the programmable duration, then a loss of sync is declared in block B234 by sending an interrupt 224. If a K character is received, then the process simply loops back to block B232.

In one embodiment, the mechanism and process provided enables efficient network operation. Loss of sync is detected efficiently and corrective measures can be taken to fix the problems that may be causing the loss of sync.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. For example, the embodiments disclosed herein are applicable to any peripheral device and are not limited to any particular adapter type. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented method of detecting a loss of sync at a port of a network device coupled to a port of another device, comprising:
    decoding a frame received at the port of the network device;
    detecting, from the decoded frame absence of an expected special character that has not been received by the port of the network device, where absence of the special character is not a code violation that occurs upon receipt of an invalid code at the port;
    generating a special character absent signal for a timer module that tracks a duration during which the special character has not been received at the port; and
    generating an interrupt signal for a processor of the network device indicating a loss of sync between the port of the network device and the port of another device when the tracked duration reaches a programmable duration.

2. The method of claim 1, wherein the special character is a K character.

3. The method of claim 2, wherein the K character is expected within a certain number of frames by the network device.

4. The method of claim 1, wherein the network device is an adapter.

5. The method of claim 1, wherein the network device uses Fibre Channel protocol to communicate.

6. The method of claim 1, wherein the network device uses Fibre Channel over Ethernet protocol for communication.

7. A network device comprising:
    a port coupled to a port of another device for sending and receiving frames; wherein the port of the network device includes:
        a decode module for receiving and decoding incoming frames;
        a word sync logic that detects if valid data has been received and generates a loss of sync signal when valid data is not received;
        a special character recognition module that detects absence of an expected special character and sends an absent special character signal for a timer when the special character has not been received by the port; wherein absence of the special character is not a code violation that occurs upon receipt of an invalid code at the port; and
        the timer that tracks a duration for which the special character has not been received at the port and generates an interrupt signal for a processor of the network device indicating loss of sync between the port of the network device and the port of the other device when the tracked duration reaches a programmable duration.

8. The network device of claim 7, wherein the special character is a K character.

9. The network device of claim 8, wherein a K character is expected within a certain number of frames.

10. The network device of claim 7, wherein the network device is an adapter.

11. The network device of claim 7, wherein the network device uses Fibre Channel protocol to communicate.

12. The network device of claim 7, wherein the network device uses Fibre Channel over Ethernet protocol for communication.

13. A non-transitory, machine readable storage medium having stored thereon instructions for performing a method, comprising machine executable code which when executed by at least one machine, causes the machine to:
    decode a frame received at the port of the network device;
    detect, from the decoded frame absence of an expected special character that has not been received by the port of the network device, where absence of the special character is not a code violation that occurs upon receipt of invalid code at the port;
    generate a special character absent signal for a timer module that tracks a duration during which the special character has not been received at the port; and
    generate an interrupt signal for a processor of the network device indicating a loss of sync between the port of the network device and the port of another device when the tracked duration reaches a programmable duration.

14. The non-transitory, machine readable storage medium of claim 13, wherein the special character is a K character.

15. The non-transitory, machine readable storage medium of claim 14, wherein a K character is expected within a certain number of frames by the network device.

16. The non-transitory, machine readable storage medium of claim 13, wherein the network device is an adapter.

17. The non-transitory, machine readable storage medium of claim 13, wherein the network device uses Fibre Channel protocol to communicate.

18. The non-transitory, machine readable storage medium of claim 13, wherein the network device uses Fibre Channel over Ethernet protocol for communication.

* * * * *